Figure 1:
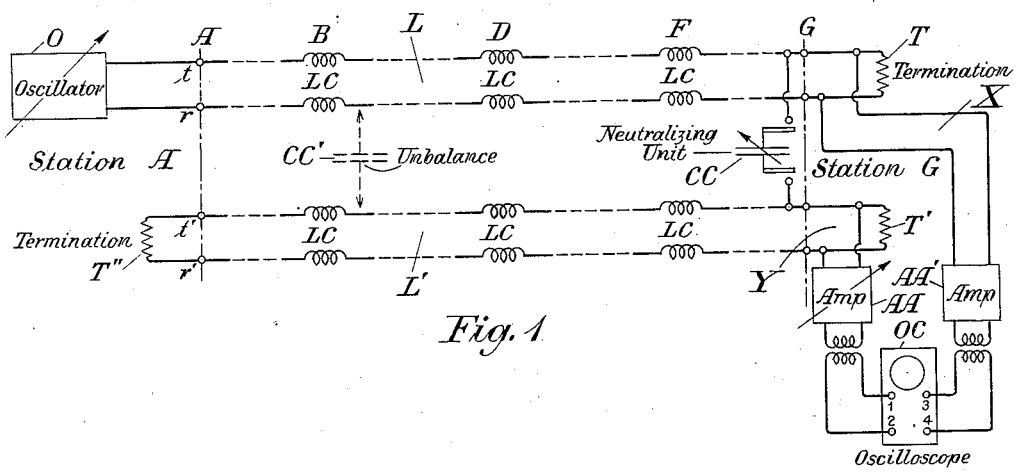

Dec. 27, 1949     C. B. ROBERTSON     2,492,400
UNBALANCE LOCATION APPARATUS
Filed Jan. 18, 1946     3 Sheets-Sheet 1

INVENTOR
C. B. Robertson
BY Jefferson Ehrlich
ATTORNEY

Dec. 27, 1949  C. B. ROBERTSON  2,492,400
UNBALANCE LOCATION APPARATUS
Filed Jan. 18, 1946  3 Sheets-Sheet 2

Observed Phase Delay on Normal Cable Pair
Combinations used as Reference Standard INVENTOR
C. B. Robertson
BY Jefferson Ehrlich
ATTORNEY Patented Dec. 27, 1949

2,492,400

UNITED STATES PATENT OFFICE 2,492,400

UNBALANCE LOCATION APPARATUS

Charles B. Robertson, Milwaukee, Wis., assignor to American Telephone and Telegraph Company, a corporation of New York Application January 18, 1946, Serial No. 641,917

4 Claims. (Cl. 179—175.3)

METHOD OF LOCATING CONDITIONS PRODUCING CROSS-TALK

This invention deals with cross-talk between communication circuits, and is particularly concerned with a method of locating unbalances or other conditions producing cross-talk or other undesirable interactions between two circuits.

Heretofore no adequate scheme has been available to locate the cause of cross-talk between the pairs in a cable. The present invention provides a practical method for locating the unbalances or other improper conditions which produce cross-talk between cable pairs.

Such cross-talk is usually caused by unbalanced capacitance or capacitances existing between wires of two circuits or pairs. Sometimes the cross-talk is due to magnetic induction or resistance unbalance. Magnetic induction occurs when unbalanced inductance exists between the two circuits. To illustrate how these factors are treated, the discussion will be confined to the case of a capacitive unbalance in loaded cables which is one of the common and yet more difficult problems to cope with at the present time in the telephone plant. The discussion, however, is not intended to preclude the case of capacitive unbalances in either non-loaded cables or open wire facilities or the inductive and resistive unbalances in both loaded and non-loaded cables and open wire facilities.

Before attempting to locate the cause of the unbalance, it is desirable to know whether the cross-talk is caused by a capacity unbalance, magnetic induction, or resistance unbalance. This may be accomplished by taking two circuits which are cross-talking into each other and, after properly terminating them, connecting a tone course to one end of one of the lines, and an oscilloscope to the distant ends of the two lines. A zero phase-shift amplifier should be connected between the oscilloscope and the line over which cross-talk is transmitted, to raise the cross-talk to substantially the same volume level as the current received directly over the line to which the tone source is connected.

With such a connection, if the unbalance is capacitive, the oscilloscope will produce a circular pattern upon its fluorescent screen because the two waves activating the oscilloscope are 90° out of phase. In the case of magnetic induction or resistance unbalance, the two currents will either be about in phase or the phase shift will be about 180°, depending upon the polarity of the induced current. In either case the movement of the cathode ray beam on the screen of the oscilloscope produces substantially a straight line. Therefore, a straight-line image or a curvilinear image, somewhat like an ellipse, indicates either magnetic induction or resistance unbalance. The term "straight-line" in reference to images will hereinafter include images approaching this condition. Whether or not it is resistance unbalance can be checked by the use of D. C. instruments in one of the usual ways well known in the art. By this check the testman determines whether magnetic induction or resistance unbalance is involved.

If desired, some idea of the magnitude of the unbalance may be obtained by connecting a variable neutralizing condenser between two wires of two cross-talking circuits at the point where the oscilloscope is connected. Since the attenuation and phase shift between the trouble point and the measuring point is about the same for both circuits, the value of the neutralizing capacity (which will be indicated by its adjustment) will approximately equal the unbalance causing the trouble.

Having determined the character of the unbalance (and if desired, its approximate magnitude), it remains to ascertain its location. The method of locating unbalances herein disclosed is based upon the fact that, for a loaded cable, the rate at which the phase delay increases with frequency over a near end cross-talk path depends upon the number of loading coils in the path. (Near end cross-talk is, of course, cross-talk measured in an adjacent circuit at the end corresponding to that at which the source of signals or current is applied to the circuit inducing the cross-talk.)

By gradually varying the frequency of the tone source from about 300 cycles per second (or whatever value gives an observable position on the oscilloscope) up to about the cutoff point of the circuit, the frequencies at which the relative phase is 0°, 90° and 180° may be readily distinguished and recorded. By plotting a curve of the observed readings, and comparing this curve with a series of standard curves calculated from the line constants or plotted by introducing known unbalances at various points in a standard circuit of the same characteristics, the loading section in which the fault occurs may be identified. This may be done by noting the similarity between the curve of the tested line, and the curve of the standard line plotted with an artificial unbalance in the corresponding loading section.

Figure 2:
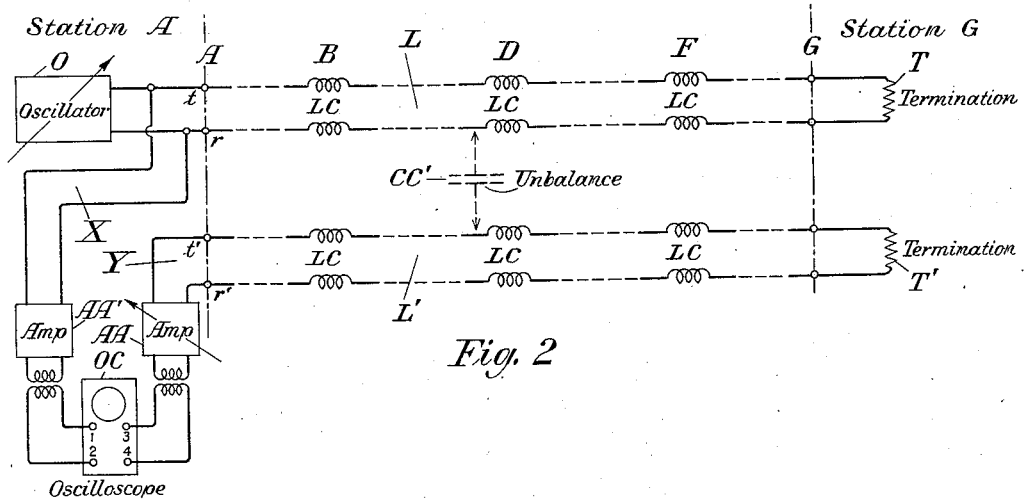
Figure 3:
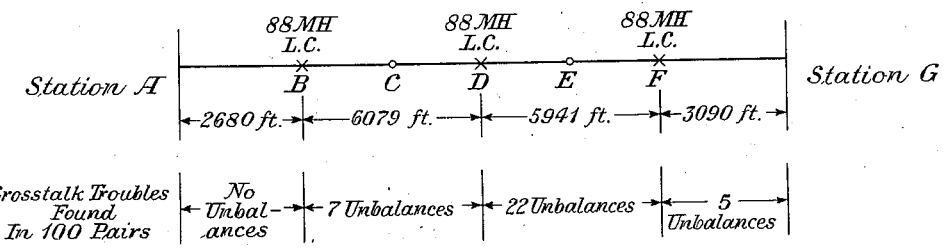
Figure 4:
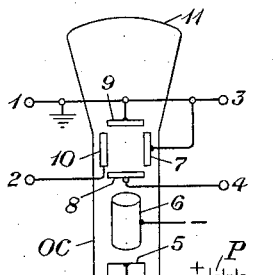
Figure 5:
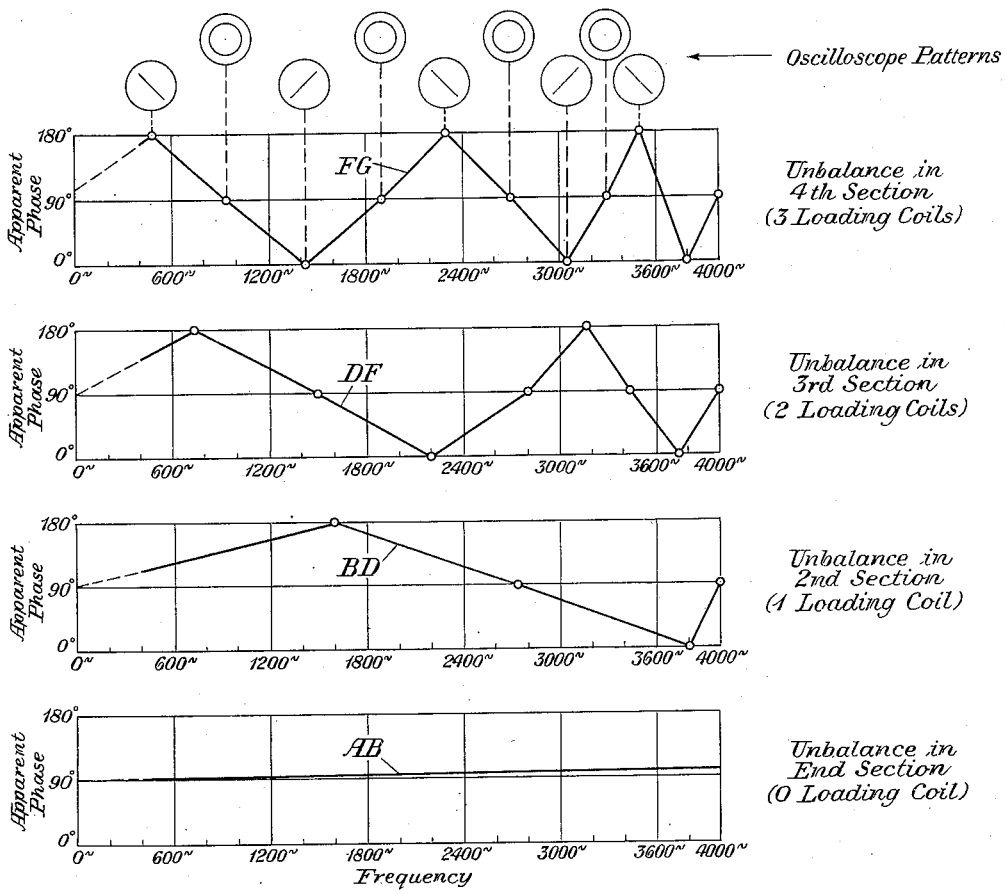
Figure 6:
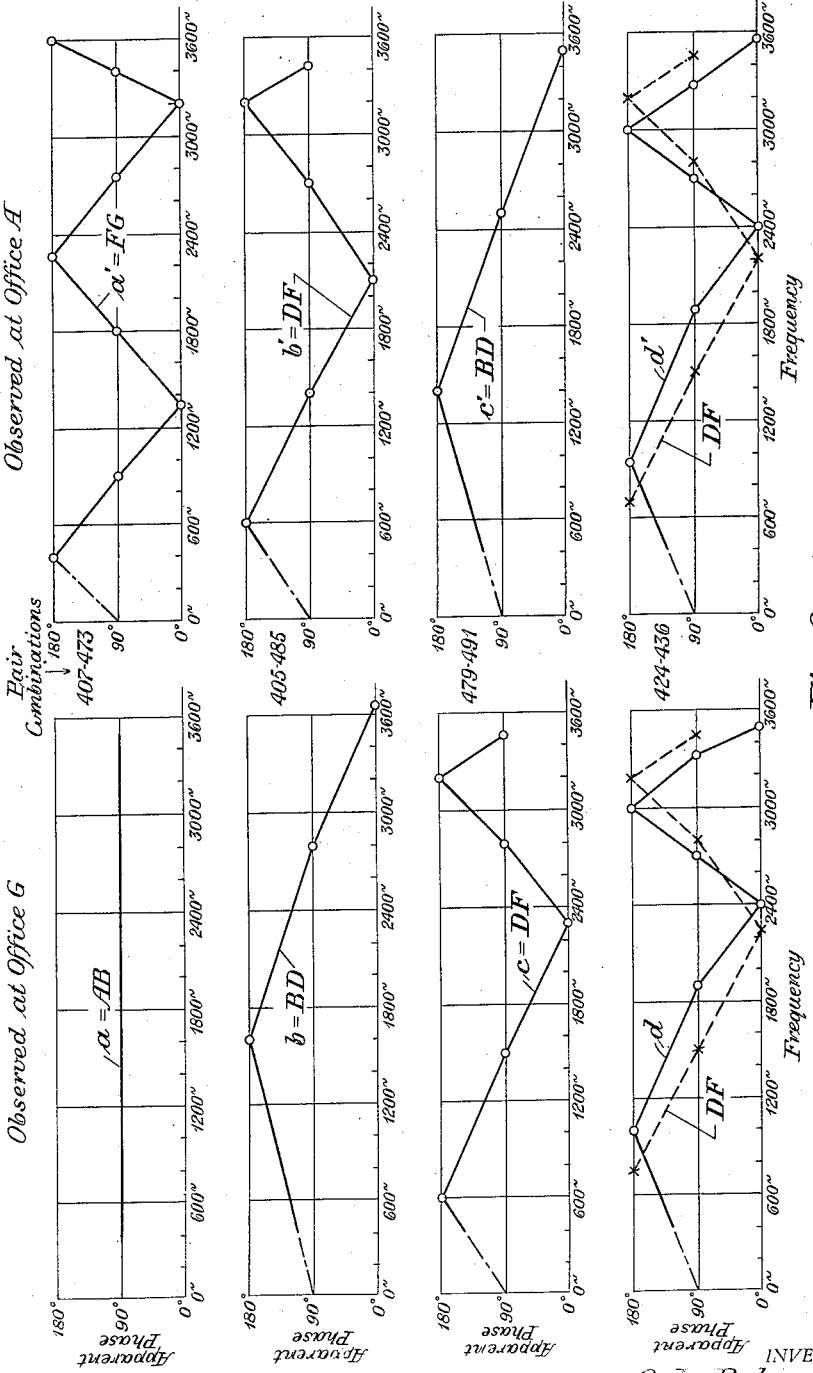

The methods involved and the apparatus for carrying them out may be better comprehended from the following detailed description of the invention when read in connection with the accompanying drawings. In said drawings, Figure 1 illustrates a circuit arrangement for ascertaining the nature and magnitude of the unbalance; Fig. 2 shows a circuit arrangement for measuring the phase shift variation with frequency in order to obtain data from which the location of the unbalance may be determined; Fig. 3 is a diagram giving certain data concerning a tested cable; Fig. 4 is a simplified representation of an oscilloscope; Fig. 5 is a series of standard curves to be used for comparison purposes, the curves being plotted from measurements of the variation in phase shift with frequency of a standard circuit unbalanced at different points under controlled conditions; and Fig. 6 is a typical group of curves obtained by testing the variation in phase shift with frequency of a number of pairs of cross-talking circuits in the inter-office cable, some of whose characteristics are indicated in Fig. 3.

ASCERTAINING TYPE OF UNBALANCE

Let us assume an inter-office cable extending underground in a city between telephone switching offices A and G and containing hundreds of pairs of wires. Each pair of wires is used as a communication line between offices and has loading coils inserted at three points B, D and F corresponding to the locations of certain manholes as indicated graphically in the upper part of Fig. 3. This arrangement divides each line into four loading sections.

The end sections adjacent each office are only about half as long as the intermediate sections between loading coils. Theoretically the end sections might each be about 3000 feet long and the intermediate section about 6000 feet long. Since the loading coils must be inserted at convenient manholes, these exact relations are not usually attained in practice. However, the actual distances given on the chart of Fig. 3 are a fairly close approximation of the optimum condition above stated.

If substantial capacitance unbalance, magnetic induction or resistance unbalance exists between one pair of wires and another pair in the same cable, cross-talk will result. The character of the condition producing the cross-talk may be determined by using the arrangements shown in Fig. 1.

In using the apparatus shown in Fig. 1 (or in Fig. 2 as described later) good results cannot be obtained unless, (a) The magnitude of the unbalance causing the cross-talk is large in comparison with the many minor unbalances which are always present.

(b) The circuits are terminated with sufficient accuracy to avoid reflections of appreciable magnitude.

In accordance with these requirements the line L in Fig. 1 (which is producing cross-talk in line L') has connected thereto at one end an oscillator O whose impedance is substantially equal to that of the line. Similarly, the opposite end of the line is terminated in an impedance termination T which is equal to the line impedance. Likewise line L' at the left is terminated in an impedance termination T' equal to the line impedance.

Connection Y at the opposite end of line L' leads through a distortionless amplifier AA to the terminals 1—2 of an oscilloscope OC. The impedance of the amplifier AA and the termination T' should be equal to that of the line. Terminals 3—4 of the oscilloscope are connected through the connection X including an amplifier AA' to the end of line L at office G. The impedance of the amplifier AA' and termination T should equal that of the line L. In general, amplifiers AA and AA' should both be zero phase-shift amplifiers or they should have nearly identical phase-shift characteristics over the range of frequencies involved in the measurements.

It will be noted that the two circuit pairs to the oscilloscope are identical except for the presence of the unbalance which forms a part of one circuit path. More precisely, it is the coupling between the lines resulting from the unbalance that forms part of one circuit path and provides the chief element of difference between the two circuit paths. Any phase shift in the circuits themselves will be practically identical and the net difference in phase indicated by the oscilloscope will be due only to the unbalance. Difference in loss over the two paths to the oscilloscope is compensated for in adjustments of the variable gain amplifiers.

The oscilloscope is a well-known device and need not be herein described in detail. Its general character will be clear from the simplified diagram of one form of the device shown in Fig. 4. A cathode 5 is activated by a source of potential P so that a stream of electrons is driven from said cathode toward the fluorescent screen 11. A tubular shield 6 is connected to a source of potential of such value and direction that it tends to focus the electron stream along the axis of the shield. The mechanism for shifting the direction of the stream includes four electrodes, 7, 8, 9 and 10. These electrodes are arranged in a plane at right angles to the plane in which (for diagrammatic simplicity) they are shown, so that they surround the stream, and when proper potentials are applied, can deflect it. A wave applied to terminals 1—2 will tend to cause the electron stream to oscillate in a straight line in one direction across the fluorescent screen. So also, a wave applied to terminals 3—4 will tend to cause the stream to oscillate across the screen in a line at right angles to that produced by a wave at terminals 1—2.

When waves are simultaneously applied to both sets of terminals, the electron stream will form on the screen a pattern dependent upon the relative magnitude of the waves and their phase relationship. With waves of equal magnitude but 90° out of phase, the pattern will be a circle. When the waves are at 0° phase relation, i. e., when the waves are in phase equality, the figure will be a straight line in a given direction, and at 180° phase relation, a line at right angles to the zero phase line will result. This is shown at the top of Fig. 5. At other phase relations various geometrical figures result which are difficult to analyze, but the figures corresponding to 0°, 90° and 180° phase differences are readily recognizable by an ordinary workman.

With this understanding of the action of the oscilloscope, the method of ascertaining the character of an unbalance producing cross-talk is very simple. Assume that the cause of the unbalance is capacity between the conductors and that the resultant capacity is equivalent to a single capacity CC' extending from ring r of line L to the tip t' of line L', and connected in the loading section between points B and D (see Fig. 1). This causes cross-talk to be transmitted from line L to line L' through the point of unbalance, then over the line L', to station G. In being so transmitted the cross-talk will be subjected to the same conditions as regards alternations and delay as the other waves from the oscillator O passing over line L from the point of unbalance to station G. As the cross-talk may be considered smaller in volume than the main wave, the amplifiers AA and AA' may be adjusted to bring both waves to the same level of amplitude.

In the case of the capacitive unbalance CC', the effect of the two waves upon the oscilloscope is to produce a circular figure on the fluorescent screen, because the capacity CC' produces a 90° phase shift between the two waves travelling over the respective lines L and L'. Magnetic induction or resistance unbalance between the lines results in a straight line pattern, indicating a 0° or 180° phase shift, depending upon the polarity of the waves. As previously stated, in such cases the presence or absence of resistance balance can be checked in a known manner by using ordinary D. C. instruments. Thus, it is easily possible to distinguish between magnetic induction and resistance unbalance.

DETERMINING MAGNITUDE OF UNBALANCE

The magnitude of the unbalance, particularly when of the capacity type, can be approximately determined when like facilities are involved, by a process of neutralization at the measuring point. For example, in Fig. 1 the capacity unbalance CC' between the ring r of line L and the tip t' of line L' may be neutralized by a condenser CC of suitable value connected between the corresponding tip of line L and the corresponding ring of line L' at station G, as shown. It will be noted that the attenuation and phase shift from the trouble point to the measuring point at station G are the same for both circuits. Therefore, when the condenser CC is adjusted until neutralization occurs, the value of the neutralizing unit (which may be read on its scale) will be approximately equal to the unbalance CC' causing the trouble.

The condition of the neutralization may be readily determined while the condenser CC is being adjusted, by disconnecting the oscilloscope from the end of line L' and connecting in its place a telephone receiver or a volume measuring set of known type. This may be done by connecting terminals 1 and 3 of the oscilloscope OC to each other and interposing the receiver or measuring set between terminals 2 and 4. When no tone is heard in the receiver or measured on the set, neutralization is indicated.

LOCATING UNBALANCES IN LOADED CABLE

The method of locating unbalances is based upon the fact that, for any particular type of cable, the rate at which the phase delay increases with frequency over a near end cross-talk path depends primarily on the number of load coils in the path. There is some attenuation and delay introduced by the line wires themselves but this is so relatively small that it may be neglected in the measurements herein considered. An observation of the relationship between phase delay and frequency existing under a particular cross-talk condition can, therefore, be used to identify the loading section containing the unbalance.

The arrangement for measuring the phase delay-frequency relationship is illustrated in Fig. 2. This arrangement is similar to that of Fig. 1 except that the oscilloscope OC is connected at the same end of the pair of lines as the variable tone source O. This enables the oscilloscope OC to respond to near end cross-talk waves induced in line L' by waves applied to the line L from the source O and transmitted back along the line L' from the point of unbalance to station A.

The oscillator O is connected to the line L at station A and a suitable termination T is connected to said line at station G to eliminate reflection effects. The line L' is similarly terminated at station G by termination network T'. The near end of line L' is connected at station A to the terminals 3—4 of the oscilloscope OC through amplifier AA. Thus cross-talk waves in line L' may be applied to terminals 3—4 of the oscilloscope OC. The oscillator O is also connected over path X and through amplifier AA to terminals 1—2 of the oscilloscope OC. By suitable adjustment of amplifiers AA and AA' the cross-talk wave may be made equal to the wave transmitted over path X.

For the purpose of the test and the discussion, the amplifiers may be disregarded inasmuch as they produce no net effect upon the phase displacement indicated by the oscilloscope OC. Therefore, any pattern observed on the oscilloscope is an indication of the phase displacement over the circuit distance to the unbalance and return. From these phenomena the distance to the unbalance can be determined by observing the rate of change of the phase displacement with change of frequency for any given case.

Bearing in mind that phase shifts corresponding to 0°, 90° and 180° may be readily recognized by the shape of the image on the fluorescent screen as indicated at the top of Fig. 5, it is evidently possible to gradually increase the frequency of the oscillator O from about 300 cycles per second to the cut-off point of the circuit and note the frequency at which phase differences corresponding to 0°, 90° and 180° occur. By plotting these points and comparing them with standard curves plotted for unbalances in different loading sections, it is possible to determine the loading section in which the unbalance occurs, as will be described later. Standard curves so plotted are shown in Fig. 5.

The oscilloscope OC as connected in Fig. 2 can only indicate phase shifts over a range of 180°. Therefore, higher values of phase displacement will merely produce repetitions or reversals of the patterns occurring in the first 180°.

For example, suppose we start the measuring operation with a wave having a frequency of the order of 300 or 400 cycles per second, and transmit it over a path from station A over line L, through one or more loading coils, to a point of unbalance and back over line L' to station A. There will be phase delay in the circuit and the oscilloscope will register the actual phase difference, which in the given case at the start might be somewhere between 90° and 180°.

As the frequency is increased the phase difference will increase until at a given frequency a phase difference of 180° will be indicated. As the frequency is further increased a frequency will be attained at which the actual phase difference is 270°, but the oscilloscope OC will only indicate 90°. Still further increase in frequency will result in actual phase differences of 360°, 450°, 540°, etc., at certain frequencies but the oscilloscope indications will be 0°, 90°, and 180°, etc., respectively. This process of increasing the applied frequency from oscillator O may be continued up to the cut-off point of the circuit if desired.

A graph may then be made plotting the applied frequency values at which the indicated phase relations were 0°, 90° or 180°. Graphs of this character are shown in Fig. 6, and were obtained by thus testing, in a given cable, a number of line pair combinations in which substantial crosstalk occurred. In each case separate curves were plotted for measurements made at each of the two terminal offices. The pair combinations involved in tests are indicated by the hyphenated numbers down the middle of the sheet.

The loading section in which the unbalance in any two tested pairs occurs may be ascertained by comparing the curve resulting from the test with the standard curves of Fig. 5. But before discussing how this is done in detail, it is desirable to understand how standard curves such as those of Fig. 5 are obtained.

This is quite simple. It may be readily done by calculation from the constants of the circuits involved. Where this is not feasible, it may be done as follows: First, two pairs are selected from the cable which by test show no indication of unbalance and are representative of the other pairs in this cable. These pairs are then tested by the circuit of Fig. 2 with artificial unbalances created by successively connecting condensers between the the pairs in the various loading sections. The frequencies at which 0°, 90° or 180° phase differences occur are then plotted and curves drawn as shown in Fig. 5.

The lower curve AB in Fig. 5 represents the condition where the unbalance is inserted in the end section ahead of the first loading coil. As the loading coil is beyond the testing circuit and does not affect the phase of the wave reflected back over the other pair from an unbalance in the end section, the phase change is nearly 90° (for a capacitive unbalance), and the resultant curve is a straight line as shown at AB.

In the case of an unbalance inserted between the first and second loading coils, the wave passes through one loading coil before being reflected back in the other pair. The loading coils affect the phase and cause the resultant curve BD to fluctuate up and down between 0 phase and 180° as shown.

Similarly, with an unbalance in the third section the wave passes through two coils before being reflected back over the other pair, so the curve fluctuates as shown at DF. Likewise, if an unbalance is inserted in the fourth section, the wave is reflected back after passing through three coils as shown at FG.

An analysis of these curves, which was obtained by measurements made at A in Fig. 3, shows that certain rules of thumb may be established to determine from the fluctuations in the curve how many loading coils the wave passes through before encountering the unbalance point. If we know how many coils the wave passes through, we know the section in which the unbalance occurs, and therefore it is necessary to explore from only a few manholes to locate the trouble.

One of these rules of thumb is to count the number of 0° phase and 180° points in the curve below a frequency in the neighborhood of 2600 cycles per second. Examination of curve AB shows no such points because the wave passes through no loading coil. This indicates that the fault lies in the first section. Curve BD shows one 180° point indicating that the wave passes through one coil and the fault lies in the second section, i. e., the section extending from B to D in Fig. 3. Curve DF passes through two points below 2600 cycles, one of 180° and the other being a 0° phase point. This indicates that the wave passes through two coils and that the fault lies in the third section. Finally, curve FG has two 180° points and one 0° phase point, or three points altogether. This indicates that the wave passes through three coils and that the fault is in the fourth loading section extending from F to G in Fig. 3.

Another rule of thumb involves counting the number of complete sequences of phase displacement (90°—180°—90°—0°—90°) occurring between zero frequency and about 4000 cycles per second. Referring to Fig. 5, curve AB has no substantial phase variation, indicating the wave is reflected before passing through any loading coil. Hence the fault lies in the first or the A to B section of Fig. 3. Curve BD goes through one complete sequence of phase displacement up to a frequency of about 4000 cycles per second. This indicates that the wave passed through only one coil and that the fault is in the second section. Curve DF goes through one complete sequence up to about 2800 cycles and another from about 2800 to about 4000 cycles. The wave here passed through two coils and the trouble is in the third section. Curve FG ends one complete sequence at about 1900 cycles, another at 3300 cycles and a third at about 4000 cycles. This means the trouble is beyond the third loading coil and hence in the last loading section at the right in Fig. 3.

With this understanding of how the standard curves are obtained and what they mean, let us consider the representative curves of Fig. 6, which were taken from four sets of tested pairs in a cable. These curves are obtained by making measurements similar to those described in connection with Fig. 5. Each two pairs tested for unbalance are tested at both ends of the cable, i. e., at stations A and G, and hence two curves are plotted for each combination of pairs. The one curve serves as a check on the other.

For example, consider the two curves at the top of Fig. 6. Curve $a$ was obtained by connecting the ends of pairs numbered 407 and 433 at station G to the oscilloscope OC, in the manner shown in Fig. 2. Curve $a'$ was obtained by connecting the other ends of the same pairs to an oscilloscope OC at station A. Curve $a$, being similar to curve AB of Fig. 5, indicates a fault in the first loading section from station G. Curve $a'$ by comparison with curve FG of Fig. 5 indicates a fault in the section three loading coils beyond station A, which is the first loading section from station G. Hence these curves check.

Similarly the curves $b$ and $b'$ of Fig. 6, obtained by connecting pairs 405 and 485 to the oscilloscope OC, show unbalances in the section beyond the first loading coil from station G and beyond the second loading coil from station A. Both curves check and indicate trouble in section D to F of Fig. 3. Likewise curves $c$ and $c'$ in Fig. 6 were obtained from pairs 479—491. These curves correspond to curves DF and BD, respectively, in Fig. 5 and indicate trouble in a section two coils beyond station G and one coil beyond station A. In both curves the section thus indicated is section B to D of Fig. 3 so again we have a check.

In the case of curves $d$ and $d'$ at the bottom of Fig. 6 the situation is different. These curves were obtained from measurements at the ends of pairs 424 and 436 at stations G and A. The patterns of curves $d$ and $d'$ are irregular and do not correspond exactly to any of the master curves of Fig. 5. However, both of these curves are more nearly like curve DF of Fig. 5 than any of the others, as is clear from the dotted line representation of said curves on the same plotted areas as curves $d$ and $d'$. One of these curves seems to indicate a fault in the section two loading coils beyond station G, i. e., the section B to D of Fig. 3. The other curve, however, appears to indicate section D to F which is two loading coils beyond station A. From this it is a logical deduction that troubles exist in both sections B to D and D to F, and this deduction is supported by, and serves to explain, the irregular shape of curves $d$ and $d'$.

CORRECTING UNBALANCES IN LOADED CABLE

Unbalances located by the above method may be corrected by condensers of proper value placed in the cable as near as practicable to the location of the unbalances, and connected so as to tend to balance out the existing unbalances. Tables 1 and 2 below give the data relative to corrections to be applied to a number of combinations of pairs.

lines. In the above tables, the first column at the left gives the pair combinations and lines involved. The second column records the conductors of the lines to which the test condenser was connected for best results, i. e., ring to ring, tip to ring, ring to tip, or tip to tip. In each case a connection must be found by trial and error which will effect a reduction in cross-talk.

When the test condenser is connected to the selected conductors, the calibrated variable condenser is adjusted until the settings are found that give minimum far end cross-talk in a suitable cross-talk meter or telephone receiver, with the oscillator connected first at one end of the circuit and then at the other. This is followed by similar tests of near end cross-talk. The corresponding condenser readings are given in the third, fourth, fifth and sixth columns. From the differences in indicated unbalances measured for far end and near cross-talk, and recorded in these columns, the approximate distances to the trouble are computed by known empirical formulae. These distances are recorded in columns seven and eight.

To correct for the unbalance, the correcting condenser must be applied fairly close to the point of unbalance to get best results. In the

TABLE 1

*Data taken with test condensers at sheath opening at D*

| Pair Combinations | Test Condenser Connected at D | Mmf. Required to Minimize Far End Cross-Talk Measured at— | | Mmf. Required to Minimize Near End Cross-Talk Measured at— | | Computed Distance from D to Unbalance from Measurements at— | |
|---|---|---|---|---|---|---|---|
| | | Station G | Station A | Station G | Station A | Station G | Station A |

DATA TAKEN WITH TEST CONDENSER AT CABLE OPENING AT D

| | | | | | | Feet | Feet |
|---|---|---|---|---|---|---|---|
| (1) 404–409 | r–r | 750 | 800 | 1,020 | 590 | 5,100 | 4,900 |
| (2) 405–425 | t–r | 1,005 | 1,020 | 1,200 | 845 | 2,830 | 3,020 |
| (3) 407–416 | r–t | 1,000 | 1,200 | 1,020 | 880 | 3,020 | 2,430 |
| (4) 414–415 [1] | r–r | 975 | 990 | 1,010 | 990 | 565 | 0 |
| (5) 431–482 | r–t | 920 | 970 | 1,325 | 685 | 5,910 | 5,650 |
| (6) 433–475 [1] | t–r | 980 | 1,000 | 1,055 | 930 | 1,130 | 1,130 |
| (7) 476–485 | t–t | 960 | 1,010 | 1,200 | 820 | 3,670 | 3,400 |
| (8) 480–487 | r–t | 1,420 | 1,475 | 1,860 | 1,170 | 4,350 | 3,850 |

[1] Connecting condenser placed on these pair combinations (4) and (6) at D.

TABLE 2

*Data taken with test condensers at cable opening at E (3,173' from D)*

| Pair Combinations | Test Condenser Connected at E | Mmf. Required to Minimize Far End Cross-Talk Measured at— | | Mmf. Required to Minimize Near End Cross-Talk Measured at— | | Computed Distance from E to Unbalance from Measurements at— | |
|---|---|---|---|---|---|---|---|
| | | Station G | Station A | Station G | Station A | Station G | Station A |
| | | | | | | Feet | Feet |
| (1) 404–409 [1] | r–t | 790 | 780 | 880 | 725 | 1,690 | 1,320 |
| (2) 405–425 [1] | r–t | 1,070 | 1,070 | 1,070 | 1,070 | 0 | 0 |
| (3) 407–416 [1] | r–t | 1,035 | 1,010 | 1,040 | 1,075 | 100 | −940 |
| (5) 431–482 [2] | r–t | 965 | 975 | 1,125 | 870 | 2,450 | 1,880 |
| (7) 476–485 [1] | r–r | 1,055 | 1,025 | 1,055 | 1,040 | 0 | −188 |
| (8) 480–487 [1] | t–t | 1,510 | 1,510 | 1,630 | 1,430 | 1,130 | 860 |

[1] All combinations equipped with correcting condensers at E except combination 431–482 (#5).
[2] Condenser apparently should be placed at F.

To obtain the above data the cable was first opened at a loading point as this would permit tests to be made in two adjacent loading sections with one sheath opening. In this instance the loading point chosen was D of Fig. 3.

Having opened the cable, test condensers are connected between conductors of unbalanced case recorded in the above tables it appeared to be desirable to place the condenser within 1200 feet of the computed location. It was therefore possible to correct only pair combinations 4 and 6 of Table 1 by connecting condensers at manhole D. Pair combinations 2, 3 and 7 indicated troubles located somewhere in the neighborhood of 3000 feet to the right of manhole D (see Fig. 3).

Accordingly the cable was opened at manhole E, which is 3173 feet from manhole D. From measurements taken at this point the data of Table 2 were obtained. The computed distances in the last two columns of the table clearly indicate that pair combinations 2, 3, 7 and 8 can be adequately corrected by condensers at manhole E as in these cases the unbalances are less than 1200 feet away from this manhole. Accordingly, these circuits were corrected by employing suitable balancing condensers.

The distance in the case of pair combination 1 shows that the trouble point is located about halfway between manholes E and F in Fig. 1. Hence there would be no advantage in opening the cable at F to place a correcting condenser there. Accordingly, a correcting condenser was applied to pair combination 1 at E with somewhat less than perfect results but with some improvement in cross-talk reduction.

In the case of pair combination 5 the computed distances indicate that a correcting condenser should be placed at manhole F. However, it was considered not worth while to open up the cable at this point to correct a single unbalance, and no attempt was made to correct this particular case.

It will be understood that data given in Tables 1 and 2 are merely examples of certain pair combinations in a cable which illustrate the procedures and principles involved. Actually the usual trunk cable contains many other pairs all of which might or might not have been subjected to the foregoing methods and procedures in order to diagnose and correct the principal unbalances.

While the invention has been disclosed with respect to location of an unbalance in a communication system causing cross-talk therein, it will be apparent that the same general apparatus and method of operation may be employed in non-communication systems for indicating and measuring unbalances between two or more electrical circuits in such systems.

While the invention has been disclosed in certain specific arrangements which are deemed desirable, it will be obvious that the general principles herein set forth may be embodied in many other organizations, widely different from those illustrated, without departing from the spirit of the invention as defined in the following claims.

What is claimed is:

1. The method of locating unbalances producing cross-talk between a first and a second two-conductor loaded transmission line among a group of such lines which consists in applying an alternating wave to one end of a third line of said group of lines which does not normally cross-talk into a fourth line of said group of lines, introducing a known artificial unbalance at a known location between said third and fourth lines, transmitting a first wave component of said wave through the coupling resulting from said unbalance and back over said fourth line to the near end thereof, deriving from said alternating wave a second component unchanged in phase, changing the frequency of the applied wave and comparing the phases of the two components at different frequencies to determine the relation between frequency and phase difference for said artificial unbalance at said location, repeating the foregoing steps for locations of artificial unbalance in different loading sections of said third and fourth lines, and then applying said alternating wave to one end of said first line and transmitting a first component over said first line, through the coupling resulting from said unbalance of unknown location between said first and second lines and over said second line to the near end thereof, changing the frequency of the applied wave and comparing at different frequencies the phases of said last-mentioned component and the component derived from said applied alternating wave without change of phase, to determine the loading section in which said unbalance of unknown location is located.

2. The method of locating an unbalance which causes cross-talk between a first and a second two-conductor loaded line, with reference to the loading intervals thereof, which method includes the steps of: applying an alternating wave to one end of said first line and transmitting a first component thereof through the coupling resulting from said unbalance and then back over said second line to the near end thereof, whereby it arrives with a phase change determined by electrical characteristics of the portion of the two lines over which it was transmitted and by said unbalance, deriving from said applied alternating wave a second component unchanged in phase, changing the frequency of the applied waves over a predetermined frequency range and comparing the phases of the two components at different frequencies in said range to determine characteristics of the dependence upon frequency, in said frequency range, of the relative phase of said components.

3. The method according to claim 2 in which the said frequency range is so chosen that the number of frequencies for which the relative phase of said components is either zero or 180 degrees will be equal to the number of loading coils through which said first wave component passes.

4. The method according to claim 2 in which the said frequency range is so chosen that when the frequency is varied over said range, the relative phase of said components goes through a number of complete 360 degree cycles equal to the number of loading coils through which said first wave component passes.

CHARLES B. ROBERTSON.

REFERENCES CITED

The following references are of record in the file of this patent:

UNITED STATES PATENTS

| Number | Name | Date |
|---|---|---|
| 1,684,403 | Mason | Sept. 18, 1928 |
| 2,294,338 | Hochgraf | Aug. 25, 1942 |
| 2,345,932 | Gould | Apr. 4, 1944 |
| 2,369,799 | Robinson | Feb. 20, 1945 |